Patented July 31, 1928.

1,678,635

UNITED STATES PATENT OFFICE.

OSCAR A. CHERRY AND CLETUS F. CHOSA, OF MILWAUKEE, WISCONSIN, ASSIGNORS TO THE CUTLER-HAMMER MFG. CO., OF MILWAUKEE, WISCONSIN, A CORPORATION OF WISCONSIN.

PLASTIC COMPOSITION AND METHOD OF PRODUCTION THEREOF.

No Drawing.    Application filed July 8, 1922. Serial No. 573,732.

This invention relates to plastic composition materials and methods of production thereof.

More particularly the invention relates to materials and the production of materials, comprising a binder and a relatively inert filler adapted to certain of the known quick molding or forming treatments.

In the production of such plastic materials it is customary to incorporate in the pre-formed binder a suitable proportion of relatively inert filler material, the ingredients being thoroughly mixed and thereafter disintegrated, screened and otherwise treated to prepare the same for molding at ordinary temperatures and under relatively high pressure.

In the case of many of the known plastic materials the bulk of the inert filler considerably exceeds that of the binder material and it has often been found in practice that the material as prepared for the molding or forming treatment is of relatively low apparent specific gravity and may even be relatively light and fluffy. Such condition of the plastic material is undesirable for many reasons.

Thus on account of the excessive bulk of material it is often necessary to increase inordinately the size of the die in the direction of the molding pressure in order to enable the same to receive sufficient plastic material to afford the proper proportions of the piece when compacted, whereas the operation of handling the material is rendered more difficult and time consuming due to the bulk thereof.

Again where particularly accurate dimensions of the finished piece must be maintained it is customary to weigh the material for production of the piece, whereas such excessive bulk of the material renders difficult the process of economical and accurate weighing.

Again the flow of the material during the forming or molding treatment appears in some instances to be to some extent lessened as a result of the excessive bulk, fluffiness and low apparent specific gravity of such material.

An object of the present invention is that of providing a method of obviating the aforementioned difficulties and disadvantages of or pertaining to such materials.

Another object is that of providing a method of increasing the apparent specific gravity of plastic materials of the character indicated.

Another object is that of providing a plastic material having the desirable attribute aforeindicated.

Other objects and advantages will hereinafter appear.

As typical of the class of plastic compounds to which the present invention is particularly applicable may be mentioned the product described and claimed in a copending application of Clarence A. Nash, filed July 19, 1920, Serial No. 397,181.

Such material comprises a binder having an incorporated relatively inert filler material, the mix being thoroughly blended, disintegrated, screened and the like to adapt the same to certain of the known rapid or cold molding treatments.

A typical binder as disclosed in such prior application may be produced as follows: Coal tar pitch, stearine pitch and gilsonite in definite proportions are slowly heated to a temperature of about 500° F. with stirring during the melting period to insure uniform mixture, such stirring being particularly necessary since said gilsonite has a higher melting point than the pitches and also a lower specific gravity than the molten pitches, thus tending to float at the top of the mix whereby melting thereof might be retarded.

After reaching the aforementioned temperature it is advantageous to maintain such temperature for a period of from one to three hours after which the mixture is permitted to cool to a temperature of about 470° F. at which temperature castor oil is added and the mixture again thoroughly stirred.

Subsequently the mass is permitted to cool to about 250° F. at which temperature a quantity of benzol or other similar solvent is added.

An indefinite amount of free carbon is ordinarily present in commercial coal tar pitch and also to a lesser degree in stearine pitch, such free carbon being precipitated during the foregoing treatment and upon completion of such treatment the mass is permitted to stand for several hours to permit such precipitated carbon to settle whereupon the supernatant compound is removed for use as a binder. The quantity of such free carbon ordinarily varies from 20% to 40% of the weight of the coal tar pitch used.

Following the aforementioned removal of the carbon a small quantity of paraffin oil may be added, the tendency thereof being to maintain the binder in a moist condition particularly where an appreciable time intervenes between preparation and use of the binder, the amount of paraffin oil moreover varies with the consistency of the binder and to some extent with temperature and climatic conditions.

A typical mix for the foregoing binder may be made in the following proportions:

Coal tar pitch, 400 lbs. (50%).
Stearine pitch, 280 lbs. (35%).
Gilsonite, 120 lbs. (15%).
Castor oil, 64 lbs. (approx. 10% of the foregoing after deduction for loss of precipitated carbon).
Benzol, 200 lbs.
Paraffin oil, (1 to 10% by weight depending upon the condition of the material with respect to dryness and other conditions).

A molding compound comprising the foregoing binder may be made advantageously by combining 150 parts of disintegrated asbestos with 37 to 40 parts of such binder together with 9 parts of a suitable vulcanizing or polymerizing agent such as sulphur, the asbestos and sulphur being first mixed in a kneading machine together with a small amount of benzol or other similar solvent which is adapted during such treatment to moisten the asbestos thereby facilitating and expediting thorough impregnation of the latter with the subsequently added binder. After addition of the binder the foregoing constituents are subjected to a further kneading treatment continuing preferably from 30 to 45 minutes or until a homogeneous mixture is effected. During such treatment a small quantity of benzol may be added if the material appears unduly dry or otherwise refractory.

During such mixing process the material forms in small balls or granules which are thereafter disintegrated and screened to the proper mesh prior to molding.

While the material produced as aforedescribed is quite capable of forming by a quick molding operation, nevertheless such material is open to many or certain of the disadvantages aforementioned pertaining to low apparent specific gravity and the like and hence it is proposed prior to the molding or forming treatment to subject the material to the following steps. To 100 parts of the aforedescribed plastic material, the same having been thoroughly disintegrated and placed within a rotary mixing machine, is added 1 part by weight of cresol. The material is thereafter stirred until the cresol is thoroughly distributed throughout the mass. Thereafter one part by weight of sulphur chloride is added while the stirring is continued.

Upon and during addition of the sulphur chloride, hydrochloric acid gas is evolved and heat is generated. From time to time samples of material may be withdrawn and the apparent specific gravity determined by a known reliable method. When the apparent specific gravity has reached the desired value the stirring is discontinued and the material may be subjected to the usual further treatments, including screening to pass any mesh desired preparatory to molding.

The time of mixing after the addition of sulphur chloride varies according to the speed of the mixing machine and according to the apparent specific gravity desired, whereas the aforementioned quantities of sulphur chloride and cresol may be somewhat reduced providing the time of mixing be correspondingly extended and vice versa. Obviously where it is desired merely to increase the apparent specific gravity of the product but not to any definite pre-determined point the step of testing the apparent specific gravity may be omitted, reliance being placed upon the judgment of the attendant. Also if desired the sequence of addition of the two principal reagents may be reversed but the results do not appear to be in anywise altered thereby.

Without limitation to any theory to account for the desirable effects obtained by the foregoing process it is believed that the addition to the compound of unreacted cresol and sulphur chloride enables an exceedingly thorough and intimate mixture due to the relatively high fluidity of said cresol and sulphur chloride while in unreacted condition. Thus the binder material which is the product of reaction of said agents is similarly thoroughly and intimately distributed throughout the mass of material and tends to adhere as a thin coating or film about the surface of the individual particles thereof with agglomeration of the finer particles.

While sulphur chloride and cresol have been mentioned as specific examples of substances which are adapted to coact with one another in accordance with the aforedescribed process it is of course to be understood that other halogen derivatives of sulphur (or another substantially equivalent element in the sixth group of the periodic system) may be substituted for the sulphur chloride, whereas similarly the cresol may be substituted by another substance, preferably organic in character, which is adapted to coact with such halogen derivative for the formation of a resinous product. Again while the specific example of the molding material adapted to be subjected to the present process has been designated as a pitch binder and asbestos filler in stated proportions, it is nevertheless to be understood that the process is applicable generally to plastic compounds comprising filler and organic binder materials.

What we claim as new and desire to secure by Letters Patent is:

1. The method of treating a molding composition comprising a relatively inert filler material impregnated with a binder, which comprises incorporation in said composition of small quantities of a halogen derivative of sulphur and a phenolic body adapted under the imposed conditions to react therewith for formation of additional binder material in situ.

2. The method of treating a molding composition comprising a relatively inert filler material impregnated with a binder, which comprises incorporation in said composition of small quantities of a halogen derivative of sulphur and an organic substance adapted under the imposed conditions to react therewith for formation of additional binder material in situ to effect agglomeration of the finer particles of the composition and subsequently disintegrating and reballing the product.

3. The method of treating a molding composition comprising a relatively inert filler material impregnated with a binder which comprises incorporation in said composition of approximately one per cent by weight each of sulphur chloride and cresol and stirring the resultant mix to promote chemical reaction between the sulphur chloride and cresol for formation in situ of additional binder material.

4. The method of treating a molding composition comprising a relatively inert filler material impregnated with a binder, which comprises incorporation in said composition of approximately one per cent by weight each of sulphur chloride and cresol and stirring the resultant mix to promote chemical reaction between the sulphur chloride and cresol for formation in situ of additional binder material to effect agglomeration of the finer particles of such composition and subsequently disintegrating the product.

5. A molding material adapted to a quick forming treatment under pressure followed by prolonged heat treatment, comprising a binder and a relatively inert filler incorporated therein and impregnated thereby, said material having also incorporated therein relatively small quantities each of a halogen derivative of sulphur and a phenolic body adapted to react therewith for formation of additional binder material in situ.

6. A molding material adapted to forming treatment under pressure, comprising a binder, a relatively inert filler impregnated thereby and having incorporated therein relatively small portions each of a chloride of sulphur and an organic substance adapted to react therewith for formation in situ of additional binder substance.

In witness whereof, we have hereunto subscribed our names.

OSCAR A. CHERRY.
CLETUS F. CHOSA.